United States Patent [19]

Cullum

[11] 4,194,031
[45] Mar. 18, 1980

[54] METHOD OF PROLONGING THE LIFE OF A TOOL JOINT MEANS

[75] Inventor: Otis O. Cullum, Bakersfield, Calif.

[73] Assignee: AMF Incorporated, White Plains, N.Y.

[21] Appl. No.: 946,771

[22] Filed: Sep. 28, 1978

[51] Int. Cl.² ........................ E21C 13/00; F16L 15/00
[52] U.S. Cl. .................................... 427/289; 285/333; 219/76.1; 51/290
[58] Field of Search ................. 219/76.1, 76.14, 76.15, 219/76.16; 228/119, 125, 140, 159, 162; 51/241 S, 241 B; 285/333, 334, 332, 332.4, 334.4, 329; 427/289

[56] References Cited

U.S. PATENT DOCUMENTS

| | | | |
|---|---|---|---|
| 3,219,397 | 11/1965 | Heldenbrand et al. | 219/76.14 |
| 3,611,541 | 10/1971 | Garrett | 219/76.14 |
| 3,816,861 | 6/1974 | Jungle et al. | 51/241 S |
| 3,989,554 | 11/1976 | Wisler | 285/333 |

FOREIGN PATENT DOCUMENTS 76008 5/1964 Mexico .

OTHER PUBLICATIONS

Brantly, History of Oil Well Drilling, Book Division Gulf Publishing Co., Houston, Tex., 1971, pp. 1014, 1028–1030.

*Primary Examiner*—Ralph S. Kendall
*Attorney, Agent, or Firm*—George W. Price; Charles J. Worth

[57] ABSTRACT

A method of prolonging the life of a tool joint on a drilling pipe, the tool joint including an external tapered surface of 18° providing an elevator shoulder, including steps of preparing or treating the tapered eroded surface, depositing in the area of said tapered surface a selected amount of material of selected metal hardness, and grinding the external surface portions of said deposited material to provide a smooth external uninterrupted surface of selected hardness and smoothness and inclined at 18° to the longitudinal axis of said pipe. A tool joint for a drill pipe having an external cylindrical surface and an external tapered surface merging with the surface of the pipe length, said external tapered surface on hardened metal being smooth, uninterrupted, and lying in a surface generated by rotating a straight line at an angle of 18° to the axis of the drill pipe.

5 Claims, 7 Drawing Figures

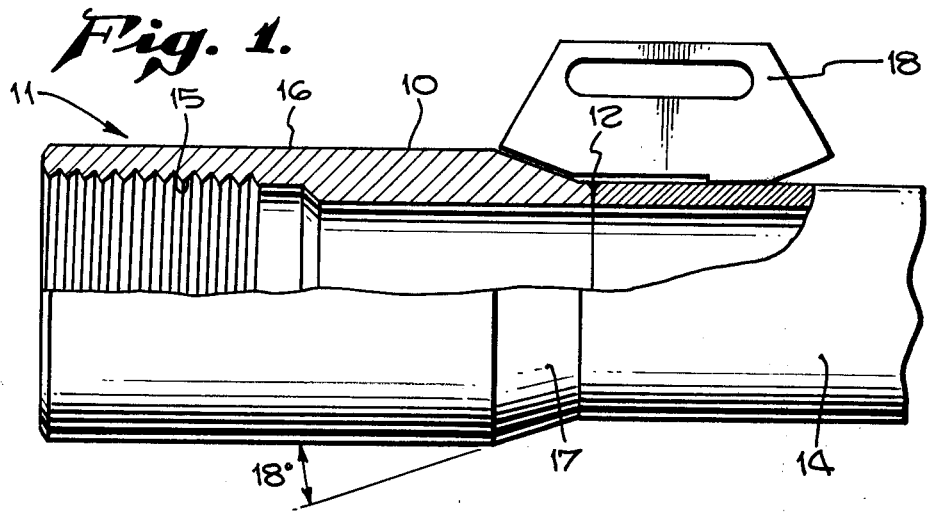
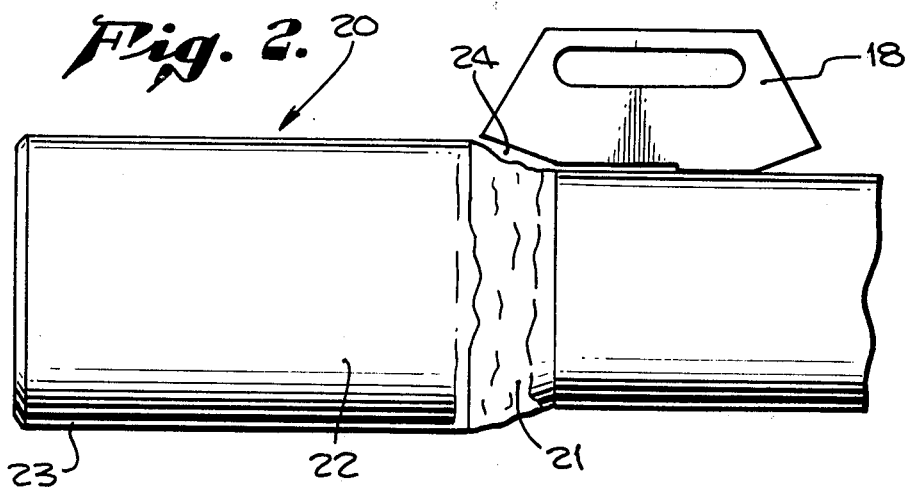
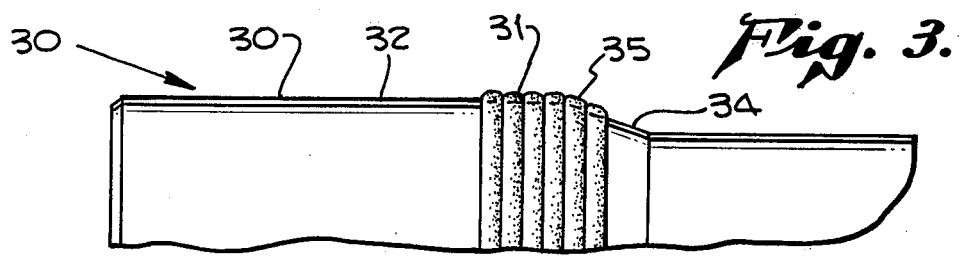

METHOD OF PROLONGING THE LIFE OF A TOOL JOINT MEANS

BACKGROUND OF THE INVENTION

The invention relates, in general, to the use of hard facing materials in tool joint construction and particularly relates to a method of improving and enhancing the service life of a tool joint which includes hard facing material.

The use of hard facing materials, such as tungsten carbide particles to form a hardened surface at a tool joint to increase wear resistance, has been disclosed in U.S. Pat. No. 3,989,554 issued Nov. 2, 1976 and in the History of Oil Well Drilling by J. E. Brantly, published in 1971 by the Book Division of Gulf Publishing Company, Houston, Tex. As apparatus and method for hardening the surface of a tool joint is also shown in Mexican Pat. No. 76008, granted in 1964 to the present inventor.

Such hard facing of a tool joint on a drill pipe greatly improved the wear resistance of the tool joint during use of the pipe in a well hole for petroleum products. In about the last ten years or so, drilling for geothermal resources has greatly increased. Drilling conditions for geothermal resources are quite different from petroleum drilling conditions in that the drill pipe is required to operate in a well hole in the presence of dry superheated steam, temperatures of from 250° F. and above with total dissolved solids of from 2,000 ppm to 200,000 ppm, and under well conditions including 100,000–200,000 pounds per hour of stream by mass weight. Under such geothermal drilling conditions, the drill pipe and tool joints and tool collars thereon are subjected to much more severe erosion conditions and the number of times the drill pipe can be used is severely limited. Because the tool joint has an outer diameter greater than the normal outer diameter of the length of pipe and is provided with an elevator shoulder having a taper of 18° to cooperate with pipe slips and clamps during running in and running out of the pipe with respect to the well hole, severe erosion and wear occurred on the elevator shoulders and on the cylindrical surface of the tool joint. Hard banding with tungsten carbide particles on the cylindrical surface and partially on the tapered surface enhanced wear resistance at these areas; however, the hard banding was accomplished with weld beads which left an external surface of quite irregular and interrupted character. When such hard banded tool joint pipe was used in geothermal applications, the irregular, interrupted contour of the hard banding provided a rough external surface for contact with the well fluid. Such a rough surface presented a multitude of surface irregularities against which geothermal well pressure fluids impinged under high temperature and pressure conditions which resulted in rapid deterioration and erosion of the hard banded weld metal and sometimes undercut adjacent softer pipe metal at the tool joint. Loss of metal at the tool joint substantially weakened the tool joint and made the pipe length nonavailable for use.

SUMMARY OF THE INVENTION

This invention contemplates a novel tool joint construction and a method for prolonging the life of such a tool joint under the severe operating conditions of geothermal drilling. The advantages of this invention are also applicable to petroleum drilling.

More particularly, the invention contemplates novel treatment of a tool joint for a drill pipe wherein erosion of tapered external surfaces forming an elevator shoulder for the drill pipe is substantially reduced and the useful life of the tool joint and associated drill pipe is prolonged.

The primary object of the present invention, therefore, is to provide a novel tool joint construction and a novel method of treating a tool joint so that the life and usefulness of the tool joint and its associated drill pipe is substantially extended.

An object of the invention is to provide a tool joint construction having smooth uninterrupted surfaces provided on hardened metal to reduce friction between well fluid and the surface of the tool joint.

Another object of the invention is to provide a tool joint construction having hardened metal in the order of 40–55 on the Rockwell "C" Scale, the surface of the hardened metal being ground to a smooth, finished surface.

Another object of the present invention is to provide a method for treatment of a tool joint which is readily adapted at the job site for use particularly on used eroded tool joints and for use on new unused tool joints.

A still further object of the present invention is to provide a method of treating a tool joint which includes an external tapered surface wherein the method includes grinding the external surface on the tapered portion to provide a selected smooth uninterrupted surface.

A still further object of the present invention is to provide a method of prolonging the life of a tool joint means on a drilling pipe wherein the method includes preparing or treating eroded metal material at the tapered portion of the tool joint, depositing at said tapered portion a quantity of selected metal to provide a selected metal hardness thereat, and providing on said deposited metal by grinding a smooth external surface at said tapered portion.

Other objects and advantages of the present invention will be readily apparent from the following description of the drawing in which an exemplary embodiment of the tool joint construction and the method of treating the tool joint is shown.

In the Drawings

FIG. 1 is a fragmentary view of a tool joint on a drill pipe, a half section of the joint end pipe being shown, the tool joint being of standard well-known construction.

FIG. 2 is a fragmentary view of a tool joint and associated drill pipe portion illustrating eroded condition of the tapered surface and box section, a gauge being shown to indicate the amount of erosion of the tapered surface.

FIG. 3 is a partial view of a tool joint and associated drill pipe which has been hard banded with tungsten carbide particles as is well-known in the art.

Figure 4:
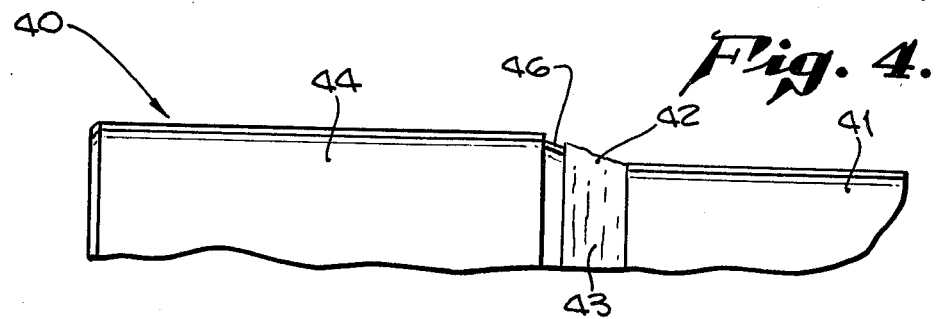
FIG. 4 is a fragmentary view of a tool joint in half section illustrating the first step in the method of this invention.

Referring first to FIG. 1, a box section 10 of a tool joint means generally indicated at 11 may be welded as by flash welding at 12 to a length of drill pipe 14. Box section 10 is shown in slightly different crosshatched lines to illustrate that box section 10 is of heat treated metal. Box section 10 is provided with internal threads 15 adapted to engage external threads on a male joint member not shown. The external surface of box section 10 includes a cylindrical external surface 16 and a tapered external surface 17 formed at an angle of 18° to join with the reduced diameter of the drill pipe 14. In FIG. 1 a gauge 18 is illustrated to show that the tapered surface 17 is made precisely at 18°. It will be understood that the tool joint 11 illustrated in FIG. 1 is by way of example and that other types of tool joints, which include a tapered external surface joining a tool joint section to its associated drill pipe, are included in the method of this invention and in the final construction of the tool joint.

In FIG. 2 an elevational view of a tool joint means 20 is shown with gauge 18 placed thereon to illustrate the effects of erosion and deterioration of a tapered surface 21 and a cylindrical surface 22 forming box section 23. It will be noticed that a substantial gap 24 appears between the 18° edge of gauge 18 and that the external surface of the box section is deeply and irregularly eroded, pitted and deteriorated. The eroded surface is exemplary and was made from examination of a box section of a drill pipe which had been operating in a geothermal well. It will be apparent that the condition of the box section rendered the pipe length useless because sufficient metal is eroded, that loads imposed upon the tool joint during drilling at depths of from 6,000 to 10,000 feet may cause breakage of the tool joint. Further, since the 18° normal taper has been reduced in diameter and is irregular about the circumference of the tool joint, the gripping and supporting of the tool joint by pipe clamps or slips during retrieval of the pipe from the well hole becomes hazardous and dangerous. The pipe clamps and pipe slips are designed for a corresponding 18° taper at the tapered surface and in the absence of an 18° taper at the preselected diameter, pipe slips or clamps may not be properly engaged with the tool joint and pipe.

In FIG. 3 the tool joint means 30 is illustrated with its external surface provided with hardened bands 31 formed by welding beads encircling the external cylindrical surface 32 of tool joint box 33 and also partially down the external tapered surface 34 as at 35. Hard banding of a tool joint is well-known in the prior art and generally is made by dropping tungsten carbide powdered particles on molten weld metal during forming of the hardened metal bands on the tool joint box section. Such hard banding provides wear resistance to well fluids and in drilling well holes for petroleum products, that is in the absence of temperature and pressure conditions found in geothermal wells, the tungsten carbide hard banding serves to prolong the life of the tool joint without further treatment.

The description of FIGS. 1, 2 and 3 is for the purpose of showing exemplary prior art tool joint box sections and an eroded box section caused by use in a geothermal well. The importance and novelty of the present invention may now be appreciated.

The present invention is shown and described in relation to FIGS. 4-7. In FIG. 4 a tool joint means 40 may be of the same construction as tool joint means 11 described above and may be considered to have been eroded from use in a geothermal well. The tool joint means 40 may be similar to tool joint means 20 shown in FIG. 2 in which the box section has been severely eroded. In the first step of the invention, a tool joint means 40, including box section 41, may be reconstructed or rebuilt by preparing the eroded surface 42 for deposit of welding metal material. Preparation may include buffing the tapered surface 43 to remove loose particles, dirt, and dust; removal of metal flakes and large irregularities in the tapered surface which would interfere with proper deposit of weld material; and removal of metal material of the tapered section adjacent the cylindrical surface 44 to provide a small annular recess 46 of about 3/16 inches or less depth for reception of hardened material for grinding flush with surface 44. Recess 46 may be made by suitable means, such as by applying a relatively course grinding wheel to the box section surfaces to be removed while rotating the tool joint and drill pipe and while rotating the grinding wheel. Since the metal of the box sections has been heat treated and is relatively hard, grinding of the surface more quickly provides the recess than by removal of the metal as by machining. Grinding of such recess 46 in a tool joint which has been severely eroded as shown in FIG. 2 may be greater than 3/16 of an inch.

Figure 5:
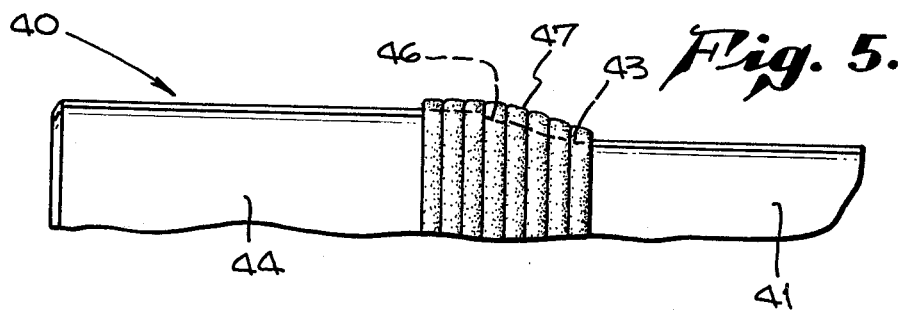
FIG. 5 is a fragmentary view of the tool joint shown in FIG. 4 illustrating the second step of this invention, the weld beads being exaggerated.

In FIG. 5 the second step of the method of this invention is illustrated. Beads of welding material 47 are applied in annular form on the eroded tapered surface 43 and in recess 46 to fill the recess and to allow upper portions of the weld bead to extend radially outwardly of the tapered surface and the cylindrical surface of the box section. Depending upon the eroded condition, the deposit of hardened material may slightly extend or displace the tapered configuration longitudinally of the pipe axis so that the tapered surface may properly merge with the cylindrical portions of the pipe. The application or deposit of the weld metal on surface 43 and in recess 46 may be accomplished in well-known manner and similar to the process described in my Mexican Pat. No. 76008. Briefly, the process described in the Mexican Pat. 76008 included hardening of the surface of a tool joint of a drill pipe by using tungsten carbide particles (not used in this example of the invention). As therein described, the pipe was placed in a horizontal position, the joint to be hardened was preheated, the pipe was then gripped to rotate the pipe while applying heat sufficient to melt the upper surface of the joint while the pipe was turning. Metal high in carbon was then introduced onto the mass of molten metal, and then particles of tungsten carbide were deposited on the molten metal at a point beyond the point of application of the heat. Finally, the joint was slowly cooled, in order to reduce internal stress; and the particles of tungsten carbide fused with the metal to form a matrix in which the tungsten carbide particles remain embedded and provide a hardened surface.

In the present example, it will be understood that the metal of the tool box section may conform to SAE specifications 4140, the electrode used to deposit the weld metal meets the chemical composition requirements for the E-70-S-3 classification for mild steel electrodes for gas metal-arc welding (AWS A5.18-69) such composition being:

C—0.06–0.15
MN—0.90–1.140
SI—0.45–0.170
P—0.025
S—0.035

Also, in the present example instead of using tungsten carbide particles to provide the hardened surface or band, an extra high carbon iron chromium composition is added to the molten metal in the same manner as the tungsten carbide particles have been added. The chemical analysis of the composition used in this example is: carbon 9.2; chromium 67.4; phosphorous 0.024; and sulfur 0.040. The particle size of this composition lies between 40–80 mesh, an exemplary screen analysis being given below:

40 mesh—0
50 mesh—29.7
60 mesh—47.5
80 mesh—21.7
thru 80 mesh—1.1

The hardness of the tool joint box section of SAE spec 4140 on the Rockwell "C" Scale is between 32 to 35, which is the same hardness for high tensile drill pipe identified as S135 API specifications. The hardened bands 46 applied in the present invention results in a hardness on the Rockwell "C" Scale of between 45–50 and in some instances, it may be desirable to apply sufficient chromium to provide a hardness of 55.

It will be understood that when an eroded tool joint is being processed according to the method of this invention that depending upon the depth of the erosion it may be necessary to apply more than one welding bead of hardened metal in order to increase the worn outer diameter of the tapered section and cylindrical portion of the tool box section so that the box section may be properly sized.

Figure 6:
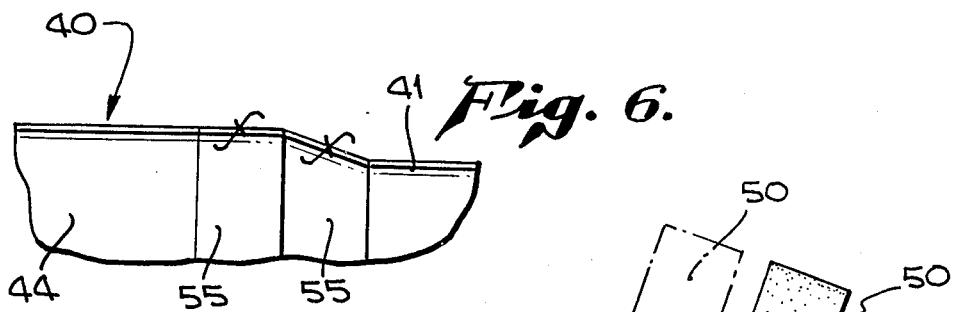
FIG. 6 is a fragmentary view of the tool joint shown in FIGS. 4 and 5 illustrating the finished smooth hardened surface resulting from grinding, the third step of this invention.
Figure 7:
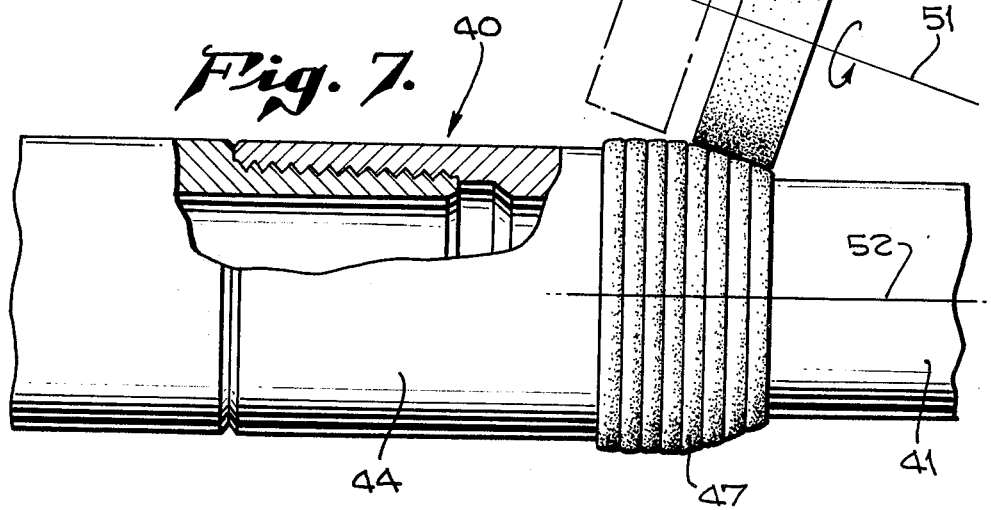
FIG. 7 is a fragmentary view of a tool joint and associated drill pipe, the tool joint being connected to a machine, not shown, for rotating the drill pipe and a grinding wheel for grinding the tool joint to provide a taper of selected angle between the tool joint box and the length of drill pipe.

In FIGS. 6 and 7 there is illustrated the third step of this invention in the grinding of the tapered portion of the tool joint to provide a smooth finished surface which reduces the rate of erosion of the tool joint. It will be apparent from a consideration of FIG. 5 that the exterior surfaces of the hardened bands 47 are not smooth but include a multitude of irregularities which are normally present during the application of weld beads to a tool joint. The weld beads are annular, the surface of each bead is irregular because of the welding process and the joining of adjacent beads with weld metal is also irregular and provides usually annular ridges. The presence of such an irregular surface provides a multitude of incremental surface areas opposed to the flow of well fluids and which react with the well fluids to increase the rate of erosion of the hardened surface.

To prolong the life of such a hardened surface, the method of the present invention provides for precisely grinding the tapered portion of the tool joint box section to a smooth, hardened surface in which such incremental surface areas are substantially eliminated. Grinding of the tapered portion of the tool joint box section includes supporting a pipe length horizontally and rotating the pipe length at a selected number of revolutions per minute by connecting the box section to a means for rotating the pipe similar to that described and disclosed in the Mexican patent. It will be understood that any suitable means may be used for rotating the box section and associated pipe about its longitudinal axis.

A grinding wheel 50 may be supported on a shaft having an axis 51 which is inclined to the axis 52 of the pipe at an angle of 18° so that a properly dressed face 53 of the grinding wheel 50 will be adapted to contact the weld beads 46 at the angle of 18° desired for the tapered external surface of the tool joint box section. Grinding wheel 50 may be supported by well-known means and adjusted on its axis 51 so that the grinding edge face 53 of wheel 50 may be positioned along the tapered portion of the box section to grind the surface of the beads 46 from the cylindrical portion of the box section to the point at which the tapered portion joins the pipe length. The width of grinding face 53 may be the width of the tapered surface.

Grinding wheel 50 may be composed of aluminum oxide or silicone carbon grits or particles embedded in a resinoid type matrix. The smoothness of the surface 55 depends upon the grit size provided in grinding wheel 50. In the present example of this invention, a grit size of 36 has been used. It will be understood, of course, that smaller grit sizes may be used since the selection depends upon smoothness of surface desired and the cost and time involved in grinding the surface.

In the grinding operation, the tool joint is rotated at a selected speed such as 6–10 rpm and the grinding wheel may be rotated at about 190 lineal feet per second at its circumference. Grinding of the tapered portion of the box section at 18° extends to the beginning of the cylindrical portion of the drill pipe or its adjacent upset end portion and to the merger of the tapered portion with the external cylindrical surface of the box section. It will be noted that in some instances it may be desirable to grind the cylindrical surface of the hardened material by adjusting the axis 51 of the grinding wheel parallel to the axis 52 of the pipe. Since the greatest wear in geothermal drilling occurs at the tapered portion, prolongation of the life of the external surface at the tapered portion is most important.

Wear of the external hardened smoothly finished surface of the tapered portion has been reduced by this method so that the life of the tool joint box section in geothermal drilling has been increased 30% to 40%. It will be understood that when the hardened ground surface becomes worn due to use in a geothermal well, upon retrieving the drill pipe, the tool joint surfaces may be again subjected to the method of this invention and additional hardening material placed on the joint and ground to a smooth finish as described above. In some instances the eroded surface of the tool joint may require only buffing of the worn surface to remove dirt or other loose particles. Preliminary grinding to remove metal material would not be then required. While the method of the invention has been described in relation to a box section of a tool joint, the method may be used on other tool joint members of different type or on well members subjected to severe geothermal erosion.

One of the advantages of the method of this invention is the facility by which worn, eroded tool joints may be repaired on a job site or at a drilling location for geothermal wells. Eroded pipe removed from the well hole may be treated and rebuilt without transporting pipe great distances. In addition, new unused pipe may be readily treated by the method of this invention at the job site if desired.

Various modifications and changes may be made in the method described above and in the tool joint which is provided with a smooth finished hardened surface and any such changes and modifications coming within the scope of the appended claims are embraced thereby.

I claim:

1. A method of prolonging the life of a tool joint means on a drilling pipe, the joint means including a member having a cylindrical surface with an outer diameter greater than the outer diameter of the pipe and having a tapered portion extending from an edge of the cylindrical surface and joining and welded to the pipe, said tapered portion having a conical surface subjected to severe conditions in a geothermal well hole from fluid in the well hole carrying abrasive particles and under high pressure and temperature; the steps of:
   preparing said conical surface of the tapered portion of said tool joint means for deposit of selected metal material;
   depositing on said entire conical surface of said tapered portion a quantity of selected material to provide a selected metal hardness at said tapered portion;
   and grinding said deposited metal about an axis parallel to said conical surface to provide a hard smooth conical external surface at said tapered portion.

2. A method as stated in claim 1 wherein the step of grinding includes providing a grinding wheel having a grit size in the order of 36 or more.

3. A method as stated in claim 1 wherein the step of depositing selected metal to provide a selected metal hardness includes hardness within the range of 45–55 on the Rockwell "C" Scale.

4. In a method of treating a tool joint means which includes a tapered portion having an external conical surface provided by a coating of hardened metal in the order of 45–55 on the Rockwell "C" Scale merging with the cylindrical surface of the associated pipe, including the step of:
   grinding the external conical surface on the tapered portion to provide a selected, smooth, uninterrupted, hardened conical surface,
   said grinding being about an axis parallel to the external conical surface and converging towards the axis of the tool joint means.

5. In a method as stated in claim 4 wherein the tool joint means includes a cylindrical external surface adjacent said external conical surface including the step of:
   grinding the external surface of said cylindrical portion to provide a longitudinally continuous, smooth, uninterrupted surface on said cylindrical and conical surfaces.

* * * * *